Nov. 9, 1971  R. E. BEGER  3,618,381
SPRING TESTER
Filed Nov. 24, 1969

INVENTOR
RICHARD E. BEGER
BY John H. Glaccum

United States Patent Office 3,618,381
Patented Nov. 9, 1971

3,618,381
SPRING TESTER
Richard E. Beger, 1220 Sunset Ave.,
Point Pleasant, N.J. 08742
Filed Nov. 24, 1969, Ser. No. 879,340
Int. Cl. G01l 1/04
U.S. Cl. 73—161
2 Claims

ABSTRACT OF THE DISCLOSURE

A spring tester employing a beam balance biased away from balance by the spring under test. The pivot of the balance is supported by a lateral extension from an upright positioned adjacent the beam. A tension plate is supported by a vertical screw thread which is itself supported by the upright. The spring under test is held by the tension plate when testing compressional springs or by a hook attached to the tension plate when testing springs under tension. The weights and the position on the beam of the weights which are needed to balance the beam biased by the spring determine the force exerted by the spring. Known displacements of the springs are made by adjusting the height of the tension plate and measuring relative positions of same and thereby the force per unit displacement of the spring may be measured.

---

An object of this invention is to provide a design that will make possible a low cost spring tester that may be sold at a fraction of the cost of devices now on the market and which, while relatively simple to operate, will test both types of springs.

Another object is to provide a device which can test, within reasonable limits, springs of any commercial diameter and length. It will be appreciated that spring testers having any desired capacity may be built employing the same principles.

With these and other objects in view which will become apparent from the following specification, reference is had to the accompaning drawings in which.

Figures 1, 2, 3:
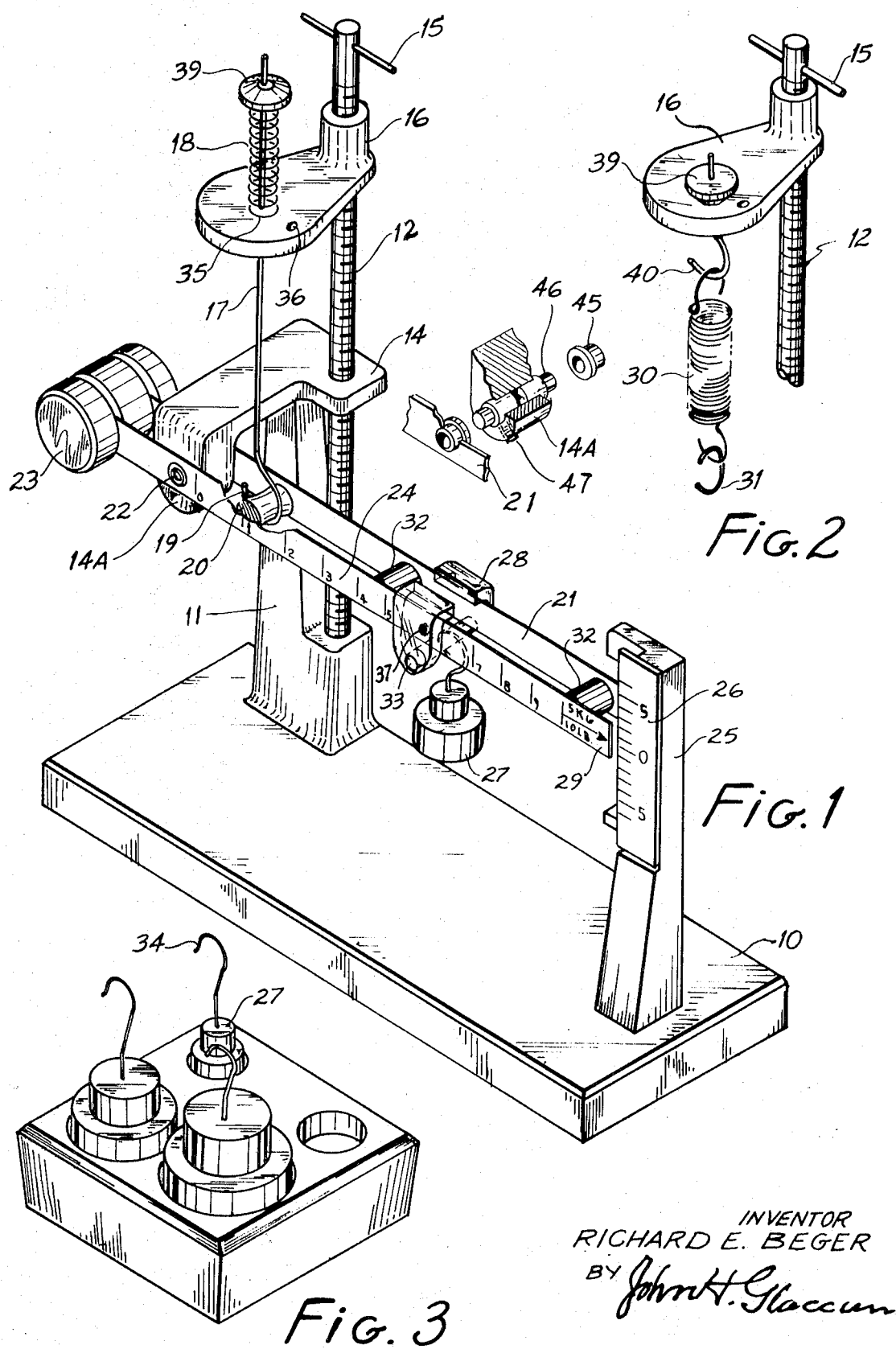
FIG. 1 is a perspective view of one form of my spring tester showing a compression spring being tested.
FIG. 2 is a partial section of the device shown in FIG. 1 with an extension spring mounted for testing.
FIG. 3 is a view of various weights adaptable for use with the tester.

Referring more particularly to the drawing, I provide a base 10 which is preferably of metal but may be made of any rigid material. Adjacent one end of the base 10 is an upright 11 mounting the beam hanger 14. Extending through the beam hanger 14 and positioned thereby is a threaded column 12 of any desired length. The column 12 is free to rotate and is not threaded to the beam hanger 14 and may be readily removed and replaced by a longer or shorter column. This may be desirable when springs to be tested are of different initial length. The column 12 is provided with a handle 15 so that it may be conveniently rotated.

The beam hanger 14 has a depending end 14A on which is pivoted the double beam 21 supported by a low friction pivot 22. The pivot 22 may be provided with ball or equal bearings if desired and does not extend beyond the surface of the beam 21 so that the poise 28 may pass over it. At one end of the beam 21 is a rotatable eccentrically mounted counterbalance 23. A number of spacers 32 are fastened between the two sides of the double beam 21 to insure rigidity between the sides thereof. The beam 21 is provided with a scale 24 and at the end thereof with a pointer 29. Slidably mounted on the beam 21 is a poise 28. The poise 28 may be made of two identical parts preferably of a transparent material connected by a spacer shaft 33 and has an indicating mark 37 on the face thereof. The spacer shaft 33 also serves as a hanger for the hook 34 of the weight 27. The indicating mark 37 is preferably to one side of the center of the poise 28 so that when the indicating mark 37 is at "0" on the scale 24, the spacer shaft 33 is at the exact center of the pivot 22 and the beam 21 may be balanced accurately on the pivot by the manipulation of the counterbalance 23. It is evident that when the weight 27 is hung below the exact center of the pivot 22, weights of different values may be interchanged without disturbing the balance of the beam 21.

At the end of the base 10 is a fixed post 25 upon which are graduations 26 running both ways from the center thereof which is indicated as "0." As the beam swings on its pivot 22, and the poise 28 is adjusted until the pointer 29 stops at "0" on the graduations 26. The reading may then be taken from the position of the poise 28 on the scale 24.

Mounted on the threaded column 12 is a tension plate 16 having internal threads engaging the threads on the column 12 so that the tension plate 16 may be raised or lowered by turning the column 12 by means of the handle 15. Tension plate has an opening 35 lined with a low friction bushing 36 made of Teflon or an equivalent material. A compression rod 17 extends through the opening 35. The compression rod 17 is provided with a hook 19 to engage the tension spacer 20 and is threaded at its upper end to engage the tension disc 39.

When a compression spring such as the spring 18 is to be tested the compression rod 17 is hooked to the tension spacer 20 and the threaded end extended through the tension plate 16. The spring 18 is placed on the tension plate 16 and the compression rod 17 and is held in place by the tension disc 39. The tension disc may be flat on one side and beveled on the other. As shown the flat side of the disc is placed against the end of the spring and the disc screwed down until contact is established.

When an extension spring shown as 30 in FIG. 2 is to be tested the compression rod 17 is not used. A hook 40 is extended through the tension plate 16 and positioned by the tension disc 39 screwed on to the threaded shank of the hook 40. As shown the beveled side of the tension disc 39 may be placed in contact with the tension 16 so that the knurled edges of the disc may be grasped readily. One end of the spring is engaged by the hook 40 and the opposite end by a C hook 31 which in turn engages the tension spacer 20. In all other respects the operation of the spring tester is the same.

In operation the tester is placed on a reasonably level surface. The poise 28 with an appropriate weight 27 attached is set at "0" on the scale 24. This brings the center of the poise 28 and the spacer shaft 33 in a direct vertical line with the center of the pivot 22. The beam 21 may then be balanced, if necessary, by rotating the eccentrically mounted counterbalance clockwise or counter-clockwise until the pointer 29 on the end of the beam 21 indicates "0" on the graduations 26. In this position the weights 27 may be removed or interchanged without disturbing the balance of the beam.

To test a compression spring the spring is set in place as shown in FIG. 1 with the poise set at "0" on the scale 24 and the pointer 29 indicating "0" on the graduations 26. The space between tension plate 16 and tension disc 39 is then measured by scale or measuring blocks and the tension plate 16 raised exactly one inch above this dimension. The poise 28 is then moved along the beam 21 until the pointer 29 again registers "0" on the graduations 26. The reading shown by indicating mark 37 on poise 28 is then taken from the scale 24 on the beam 21.

To test an extension spring the spring is set in place as shown in FIG. 2. The procedure is the same as described for compression springs except that the measurement by scale or Jo blocks is taken between beam hanger 14 and tension plate 16.

It is well known that within the elastic limit of any material deflection is proportional to the load. Therefore for springs with a higher rate than the described tester capacity of 5 kg. or 10 lb. or too short to deflect 1″ my tester may still be used by raising the tension plate only ½″ and multiplying the load reading by two, or by raising the tension plate ¼″ and multipling the load reading by four. This will double and quadruple the capacity of the tester.

It will be appreciated that throughout the construction of the device friction and errors caused thereby have been kept at a minimum. For instance the depending end 14A of the beam hanger 14 which mounts the pivot 22 is provided with a shaft 46 positioned therein and locked in by a set screw 47. The ends of the shaft 46 have low friction bearings 45 which in turn engage the beam 21. Also a low friction bushing 36 to reduce friction with compression rod 17 is an integral part of opening 35.

While I have described a spring tester having certain capacities and relative size it will be appreciated that this is solely for the purpose of illustration and description of the invention and the inventive concepts involved and are not by way of limitation. It is believed obvious that a tester embodying the same principles and employing the identical concepts may be built of any desired size and capacity to test springs of any length and diameter.

I claim:

1. A spring tester including a base, an upright on said base adjacent one end thereof, said upright having a lateral extension with a beam hanger depending therefrom, a threaded column freely mounted through said upright and in said base, a tension plate adjustably mounted on said threaded column and adapted to be raised or lowered by the rotation of said threaded column, a beam pivoted on said beam hanger, a poise slidably mounted on said beam, a compression rod extending through a low friction bushing in said tension plate having the upper end of its shank engaged by an adjustable tension disc, the lower end of said compression rod being in the form of a hook engaging said beam and a spring to be tested placed between the tension plate and said tension disc on said compression rod.

2. A testing device for either compression springs or extnesion springs comprising a base, an upright on said base adjacent one end thereof, a threaded column freely mounted in said upright, a tension plate adjustably mounted on said threaded column, the position of said tension plate being controlled by the rotation of said threaded column, a beam having a scale thereon pivotly mounted on said upright, a poise slidably mounted on said beam, a selected weight hung from said poise, a counterbalance on one end of said beam, said counterbalance being eccentrically and rotatably mounted, an upright post on said base adjacent the opposite end of said beam having fixed graduations thereon, means to position a spring to be tested, said means being adjustable to vary the tension or pressure on said spring, said means including means to position one end of said spring with relation to the tension plate, hook means engaging the other end of said spring and connecting it with said beam, and the first mentioned upright is provided with a lateral extension having a depending beam hanger on which the beam is pivoted by means of a pivot that is flush with the surface of the beam so that when the poise is moved to a position where its indicating mark is on "0" on the beam scale the center of the poise is over the center of the pivot and the beam may be balanced by the rotation of the eccentrically mounted counterbalance.

References Cited
UNITED STATES PATENTS

| | | | |
|---|---|---|---|
| 299,758 | 6/1884 | Du Brul | 177—246 |
| 2,383,408 | 8/1945 | Morgan | 177—236 |
| 2,591,868 | 4/1952 | Puster | 73—161 X |
| 2,812,659 | 11/1957 | Humphreys | 73—161 |
| 3,135,344 | 6/1964 | Olyphant | 177—246 |
| 3,334,698 | 8/1967 | Von Ronn | 177—171 |

LOUIS R. PRINCE, Primary Examiner

D. E. CORR, Assistant Examiner